(12) United States Patent
Lessard

(10) Patent No.: US 7,032,718 B1
(45) Date of Patent: Apr. 25, 2006

(54) WHEELBARROW BRAKE SYSTEM

(76) Inventor: Maurice Lessard, 1239 Rue des Saules, Prevost, Quebec (CA) J0R 1T0

( * ) Notice: Subject to any disclaimer, the term of this patent is extended or adjusted under 35 U.S.C. 154(b) by 0 days.

(21) Appl. No.: 10/997,554

(22) Filed: Nov. 24, 2004

Related U.S. Application Data

(63) Continuation-in-part of application No. 10/634,495, filed on Aug. 6, 2003, now abandoned.

(51) Int. Cl.
*B62B 5/04* (2006.01)
(52) U.S. Cl. .......................... 188/19; 188/2 D; 188/20
(58) Field of Classification Search ................ 188/2 D, 188/24.21, 20, 24.12, 24.22, 19, 72
See application file for complete search history.

(56) References Cited

U.S. PATENT DOCUMENTS

| | | | | |
|---|---|---|---|---|
| 2,716,031 A | * | 8/1955 | Roessler ................... | 280/47.31 |
| 4,640,520 A | * | 2/1987 | Wing et al. .............. | 280/47.31 |
| 4,962,833 A | * | 10/1990 | McCurdy ................... | 188/2 R |
| 5,564,531 A | * | 10/1996 | Lumpkin .................. | 188/24.19 |
| 6,148,963 A | * | 11/2000 | Canfield, Jr. ............. | 188/24.21 |
| 6,286,631 B1 | * | 9/2001 | Kimble ........................ | 188/19 |
| 6,443,267 B1 | * | 9/2002 | Burbank et al. ............ | 188/2 R |

* cited by examiner

*Primary Examiner*—Devon C. Kramer

(57) ABSTRACT

A brake system for a wheelbarrow includes a plurality of elongate mounting brackets having opposed end portions connected to the frame of the wheelbarrow and an axle passing through the wheel, respectively, so that the plurality of mounting brackets become disposed on opposite sides of the wheel. The brake system further includes a plurality of levers including first end portions pivotally connected to the plurality of mounting brackets, respectively. The plurality of levers further include second end portions disposed rearwardly from the first end portions, respectively. A plurality of brake pads are connected to the plurality of levers and extend inwardly towards opposed sides of the wheel, respectively. A brake handle is connected to the frame and a cable mechanism cooperates with the brake handle for causing the plurality of brake pads to engage and disengage the wheel as the plurality of brake levers are pivoted outwardly and inwardly, respectively.

2 Claims, 5 Drawing Sheets

WHEELBARROW BRAKE SYSTEM

CROSS REFERENCE TO RELATED APPLICATIONS

This a Continuation-in-Part Application of U.S. application Ser. No. 10/634,495, filed on Aug. 6, 2003 now abandoned.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to brake systems and, more particularly, to a wheelbarrow brake system including a plurality of pivotable brake levers selectively operable by a brake handle. The brake system being adjustably attachable onto existing wheelbarrows so that a user can retrofit the brake system onto various wheelbarrows employing alternate sized and shaped wheels.

2. Prior Art

Wheelbarrows are universally utilized in the construction industry for transporting building materials, such as bricks, sand, and mortar from one place to another on a construction site. A wheelbarrow load of the above-mentioned materials may weigh several hundred pounds, yet the operator must often push a fully loaded wheelbarrow under his own power up inclines, such as walkways, leading from one construction level to another.

Even more difficult is the task of handling a loaded wheelbarrow on a decline. Not only does an operator have to guide the wheelbarrow, but because of the inertia generated from the downward movement of the heavy load, the operator must actually exert pull opposite the direction of movement to prevent the wheelbarrow from moving too fast. In some instances the load may be too heavy to be controlled in the above manner. As a result, the operator may lose control of the wheelbarrow, whereupon it continues down the decline out of control, risking damage to property and injury to others nearby.

Furthermore, prior art brake systems for wheelbarrows are designed for specific wheel shapes and sizes. In other words, a one-size-fits-all brake system is not readily available in the industry and, therefore, an owner of a wheelbarrow may not be able to equip their wheelbarrow with a universal brake system. In particular, the diameter of a wheel may be too great to accommodate the resilient movement of brake pads.

In an effort to solve the aforementioned problems, prior art attempts have been proposed for wheelbarrows or other material handling vehicles to permit the operator to more easily control the speed thereof on a decline. However, such previously proposed brake mechanisms have been inadequate and have presented problems in guiding or controlling the vehicle while operating the brake mechanism.

BRIEF SUMMARY OF THE INVENTION

In view of the foregoing background, it is therefore an object of the present invention to provide a wheelbarrow brake system that is easily operable and overcomes the above-mentioned shortcomings. These and other objects, features, and advantages of the invention are provided by a human powered vehicle including a frame and a wheel connected thereto. A brake system includes a plurality of elongate mounting brackets having opposed end portions connected to the frame of the wheelbarrow and an axle passing through the wheel, respectively, so that the plurality of mounting brackets become disposed on opposite sides of the wheel.

The brake system further includes a plurality of levers including first end portions pivotally connected to the plurality of mounting brackets, respectively. The plurality of levers further include second end portions disposed rearwardly from the first end portions, respectively. A plurality of brake pads are connected to the plurality of levers and extend inwardly towards opposed sides of the wheel, respectively. The plurality of brake pads are disposed adjacent the first end portions of the plurality of levers, respectively.

A brake handle is connected to the frame and a cable mechanism cooperates with the brake handle for causing the plurality of brake pads to engage and disengage the wheel. The cable mechanism is connected to the brake handle and to the second end portions of the plurality of levers, respectively. The second end portions of the plurality of levers extend outwardly and away from the wheel.

The cable brake mechanism preferably includes a support member, and a first elongate cable having opposed end portions connected to the brake handle and the support member, respectively. The support member is disposed substantially medially of the plurality of levers and preferably rearward of the plurality of brake pads. The brake mechanism further includes a second elongate cable connected to the support member and one of the plurality of levers, respectively. A third elongate cable is connected to the support member and another of the plurality of levers, respectively.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
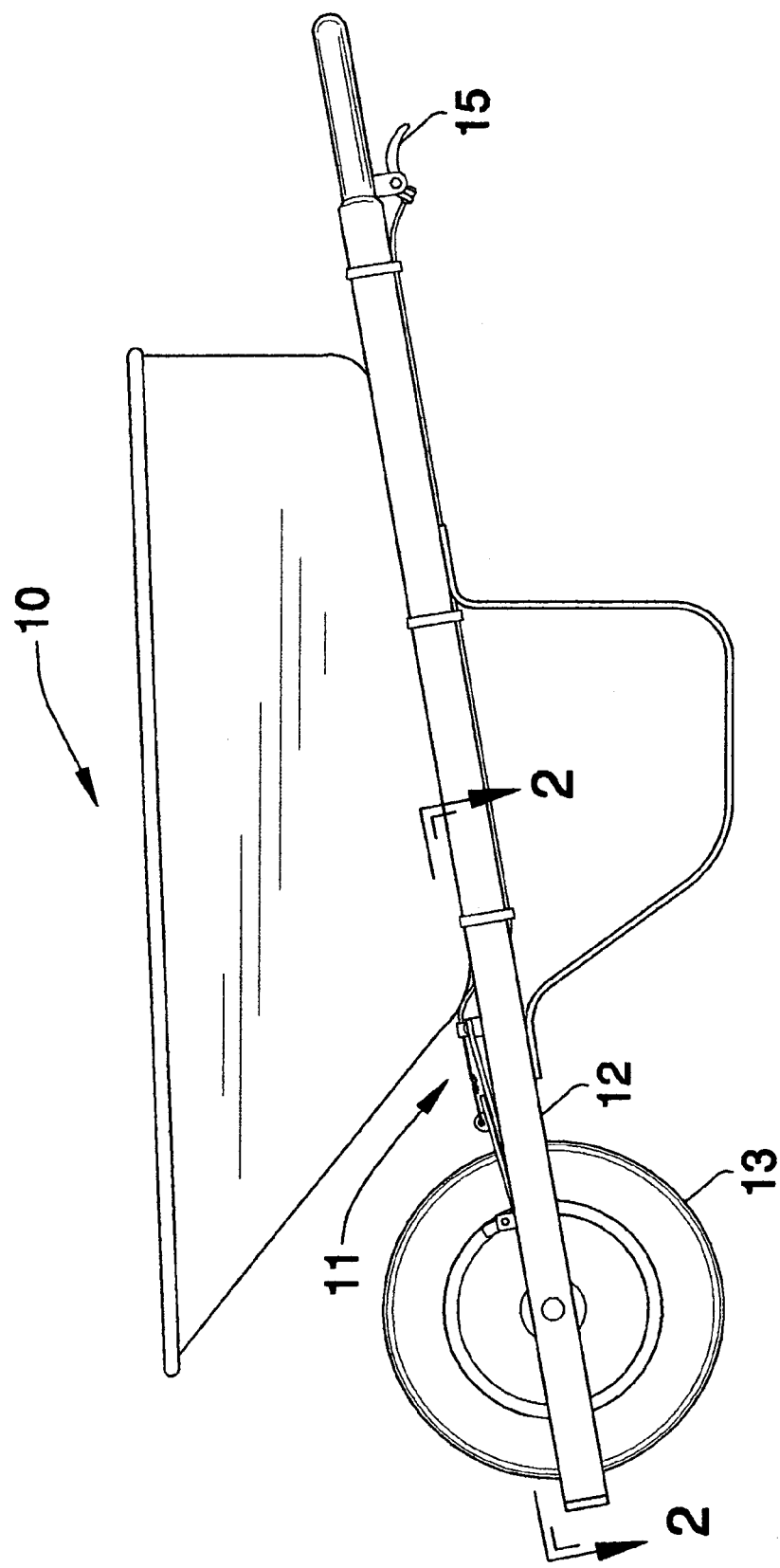
FIG. 1 is a side elevational view showing a wheelbarrow including a brake system, in accordance with the present invention.

Applicant's pending patent application Ser. No. 10/634,495 is hereby incorporated by reference. The apparatus of this invention is referred to generally in FIG. 1 by the reference numeral 10 and is intended to provide a brake system for a hand-powered vehicle. The specific disclosure herein is that of a wheelbarrow, but the invention hereof is not limited to a particular type of hand-powered vehicle. Furthermore, it should be understood that the brake system may be sold separately and as an after-market assembly as well as a pre-installed assembly with a hand-powered vehicle.

Figure 4:
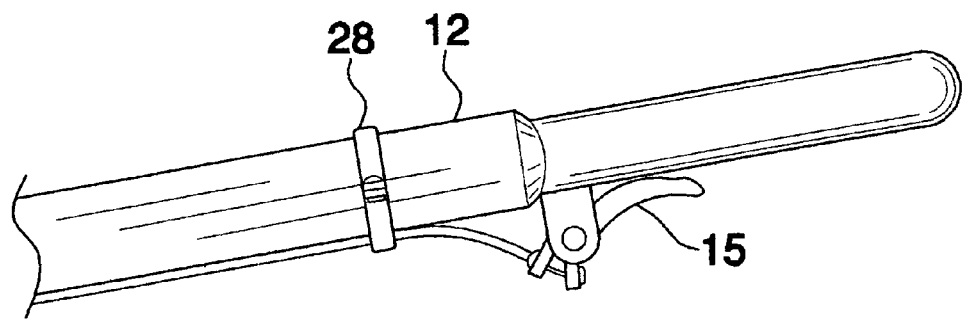
FIG. 4 is an enlarged side elevational view of the brake handle shown in FIG. 1.

The apparatus 10 includes a wheelbarrow having a frame 12 and a wheel 13 connected thereto. The apparatus 10 further includes a brake system 11 operably connected to the wheel 13 of the wheelbarrow. The brake system 11 includes a brake handle 15 connected to a handle portion of frame 12. Such a brake handle 15 may be operated in a conventional manner, as well known in the art and as perhaps best shown in FIG. 4.

Figure 2:
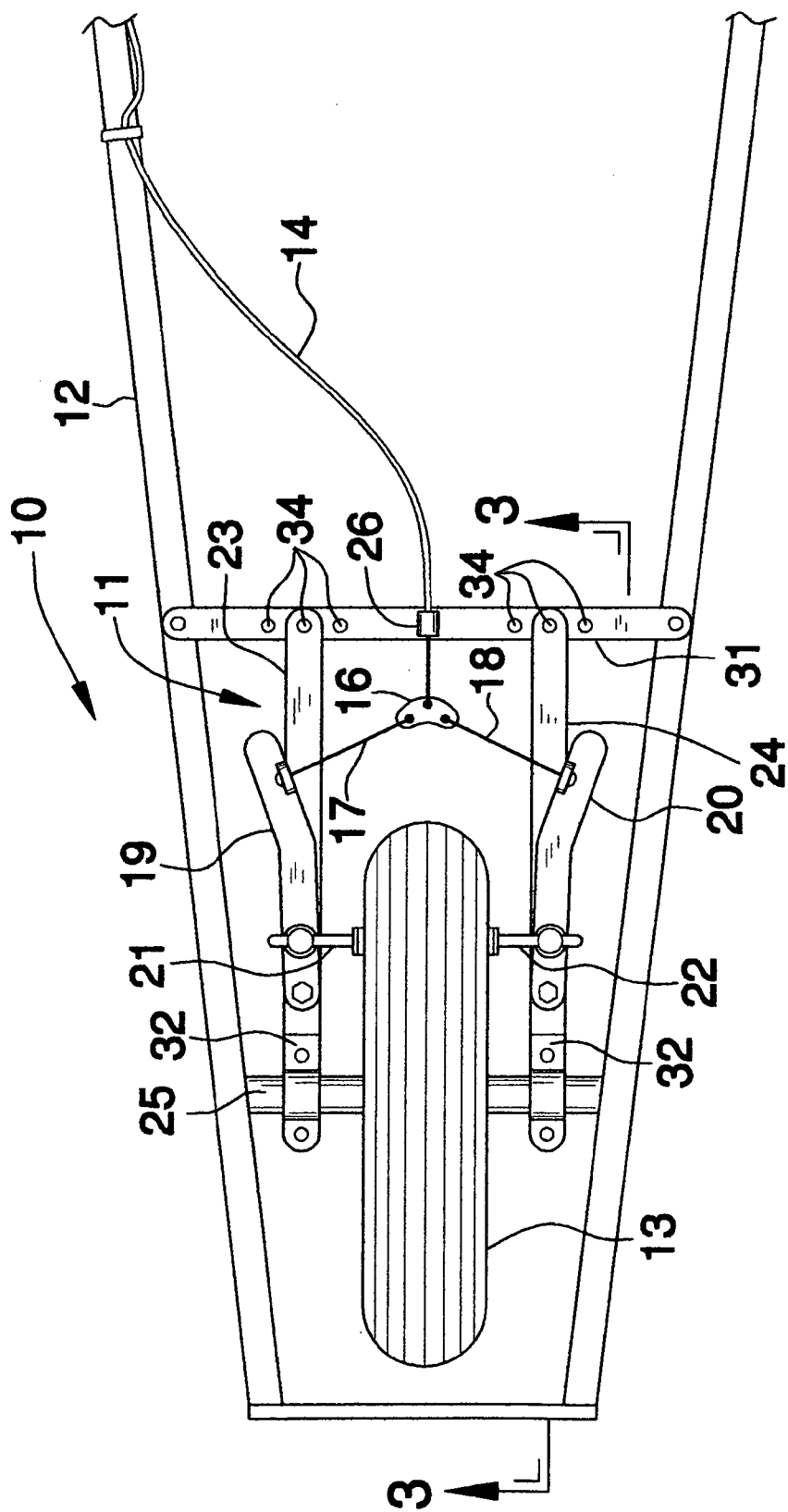
FIG. 2 is an enlarged bottom plan view of the apparatus shown in FIG. 1.
Figure 3:
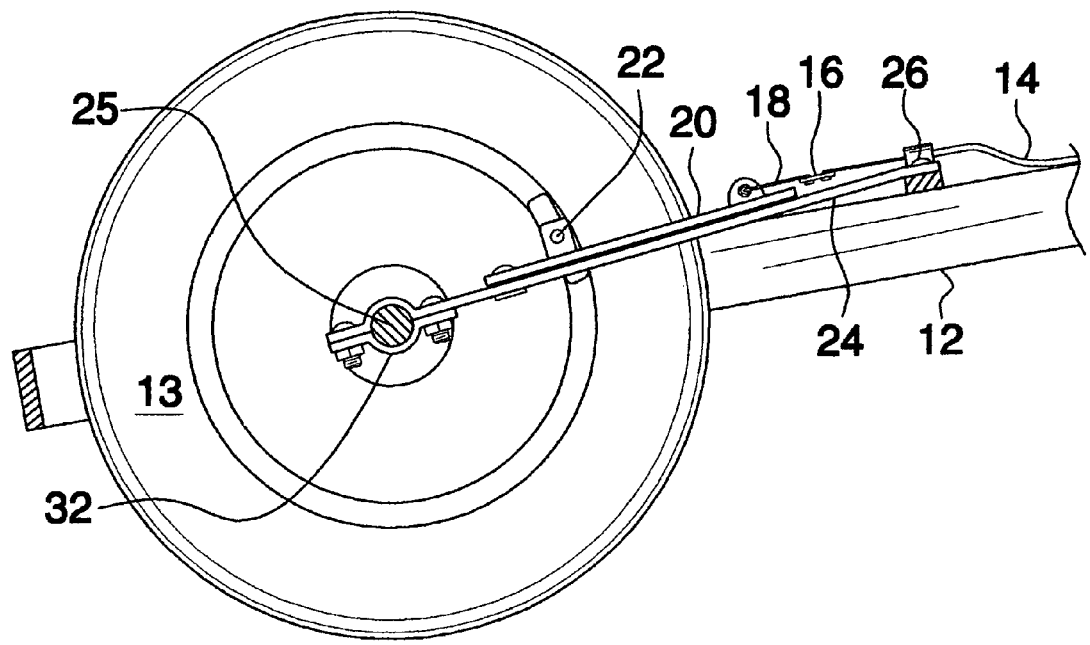
FIG. 3 is an enlarged side elevational view taken along line 3—3 shown in FIG. 2.

Referring to FIGS. 2 and 3, an elongate cable 14 having opposed end portions is connected to the brake handle 15 and is directed forwardly beneath the container portion of the wheelbarrow. The cable 14 passes through a guide member 26 for connecting to a support member 16. Such a support member is disposed rearward of wheel 13 and substantially medially of frame 12. Second and third elongate cables 17, 18 are connected to the support member 16 and corresponding rearward portions of a pair of brake levers 19, 20, respectively. Such rearward portions are angled and extend outwardly away from support member 16.

Brake levers 19, 20 are connected to a plurality of elongate mounting brackets 23, 24 having opposed end portions connected to axle 25 and frame 12, respectively. In particular, axle 25 passes through wheel 13 and has opposed end portions disposed outwardly therefrom and to which corresponding front portions of mounting brackets 23, 24 are connected via conventional fastening members. A pair of brake pads 21, 22 are connected to corresponding front portions of the pair of levers 19, 20 and extend inwardly towards the outer edge portion of wheel 13. Such brake pads 19, 20 are operably engaged and disengaged with wheel 13 when an operator presses and depresses handle 15, respectively.

In particular, when brake handle 15 is pressed, cable 14 is pulled rearwardly to thereby cause cables 17, 18 to also move rearwardly, at support member 16. Such movement causes the rear end portions of the brake levers 19, 20 to move inwardly and pivot about corresponding fastening members disposed at a forward portion thereof, respectively. Likewise, when brake handle 15 is depressed, the brake pads 21, 22 are caused to move away from the wheel 13.

In a preferred embodiment, as shown in FIGS. 1–4, a first pair of U-clamps 32 secures the distal end portions of the mounting brackets 23, 24 to the axle 25. Proximal end portions of the mounting brackets 23, 24 are removably secured to frame 12 via conventional fastening members such as threaded bolts and nuts, for example. Thus, a user may loosen the proximal end portions of the mounting brackets 23, 24 such that the distal end portions of the mounting brackets 23, 24 can be slidable positioned along the longitudinal length of the axle 25. Such a feature is particularly helpful when a different sized wheel is installed 13 onto the wheelbarrow such that the brake levers 19, 20 can be selectively adapted to maintain effective surface contact with the wheel 13 during operating conditions.

In an alternate embodiment, a second pair of U-shaped clamps 33 are also adjustably connected to the proximal end portions of the mounting brackets 23, 24 respectively. Thus, a user can slidably mounting brackets 23, 24 along both the axle 25 and to the wheelbarrow frame 12. Accordingly, a user can advantageously retrofit the brake system 10 onto various wheelbarrows 12 having alternate sized and shaped wheels 13 and frames 12. The mounting brackets 23, 24 preferably extend substantially orthogonal to the axle 25 and are slidably engageable with the axle 25 along a linear path defined orthogonal to a longitudinal length of the mounting brackets 23, 24 respectively. Advantageously, a user can retrofit the brake system 10 onto various wheelbarrows equipped with alternate wheels having unique shapes and sizes. The U-shaped clamps 32, 33 are coupled to opposed end portions of the mounting brackets 23, 24 respectively such that the annular shape of clamps 32 can be mated about the cylindrical outer surfaces of the frame 12 and axle 25.

Figure 5:
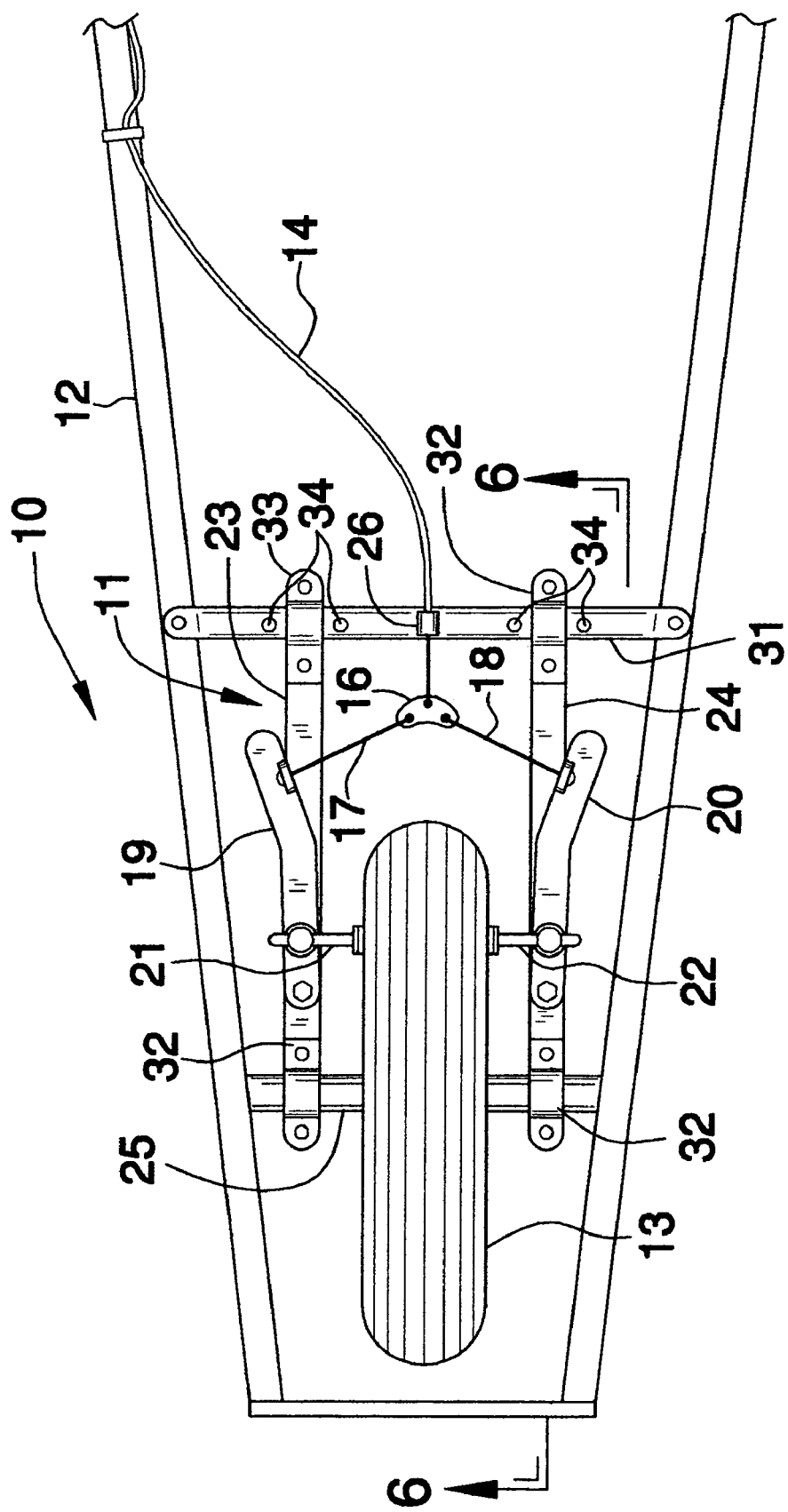
FIG. 5 is a bottom plan view showing an alternate embodiment of the present invention wherein a plurality of U-shaped clamps adjustably secure the proximal and distal end portions of the mounting brackets to the wheelbarrow frame and axle respectively.
Figure 6:
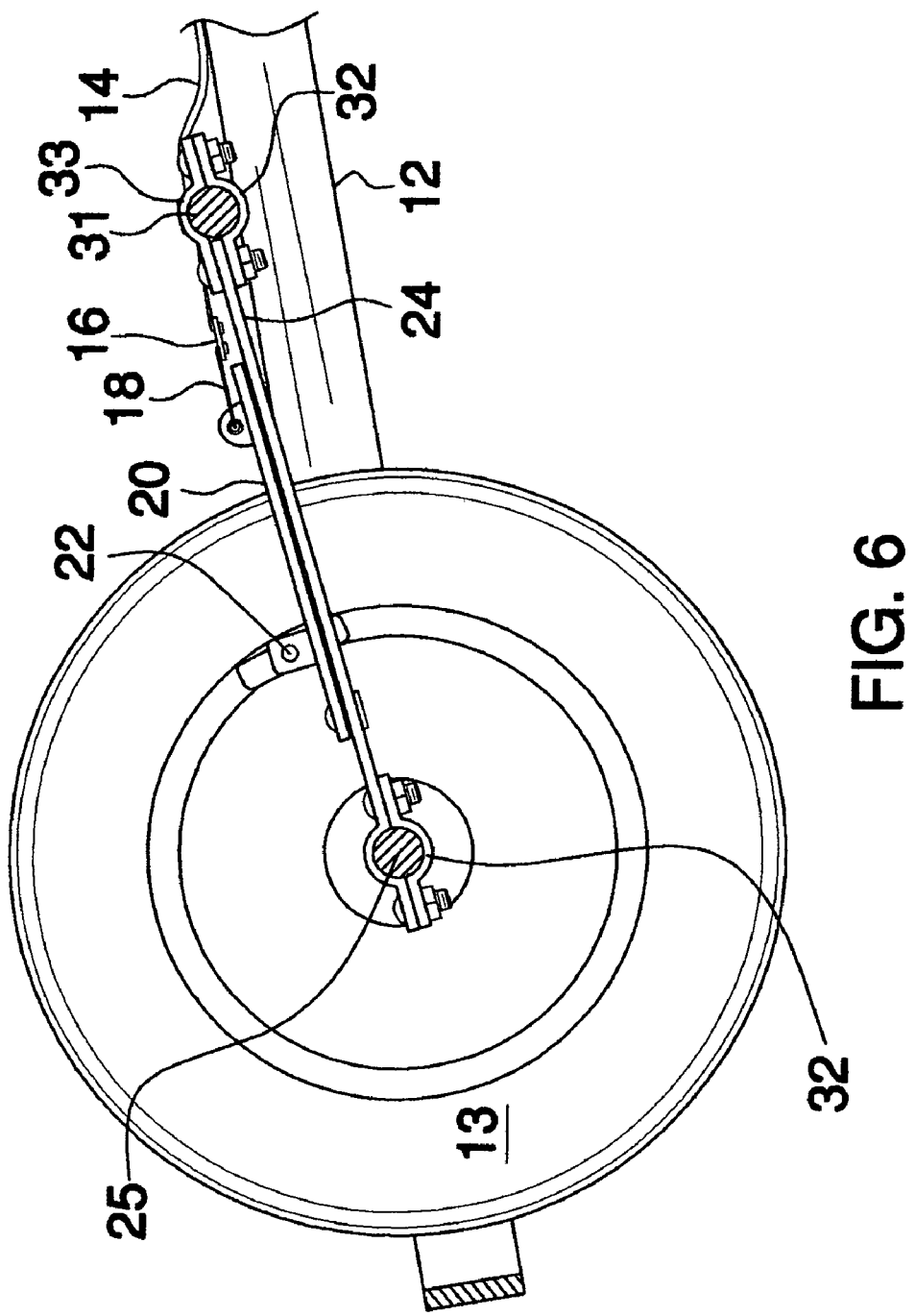
FIG. 6 is a partial side elevational view of FIG. 5 showing the first and second pair of U-shaped clamps secured to the axle and wheelbarrow frame respectively.

Referring to FIGS. 2 and 5, a bar 31 has opposed end portions directly connected to opposite sides of the wheelbarrow frame 12. Such a bar 31 includes a plurality of apertures 34 formed therein and spaced adjacent to mounting brackets 23, 24 so that such mounting brackets can be adjustably attached to the bar 31 as desired by the user. A clamp 28 is shown wrapped about the wheelbarrow frame 12 adjacent to the handle 15 for maintaining the cable 14 safely abutted against the wheelbarrow frame 12.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A human powered vehicle including a brake system and comprising:

a wheelbarrow including a frame and a wheel connected thereto;

a plurality of elongate mounting brackets having opposed end portions connected to said frame of said wheelbarrow and an axle passing through said wheel respectively;

a plurality of levers including first end portions pivotally connected to said plurality of mounting brackets respectively, said plurality of levers further including second end portions disposed rearwardly from said first end portions respectively;

a plurality of brake pads connected to said plurality of levers and extending inwardly towards opposed sides of said wheel respectively;

a brake handle connected to said frame;

cable means cooperating with said brake handle for causing said plurality of brake pads to engage and disengage said wheel, said cable means being connected to said brake handle and to said second end portions of said plurality of levers respectively; and a plurality of U-shaped clamps adjustably connectable to the axle and to the wheelbarrow frame such that said mounting brackets can be slidably positioned along at least a longitudinal portion of the axle and the wheelbarrow frame respectively to thereby allow a us retrofit said brake system onto various wheelbarrows having alternate sized and shaped wheels, wherein said mounting brackets extend substantially orthogonal to the axle and are slidably engageable with the axle along a linear path defined orthogonal to a longitudinal length of said mounting brackets respectively;

wherein said cable means comprises a support member, a first elongate cable having opposed end portions connected to said brake handle and said support member respectively, a second elongate cable connected to said support member and one said plurality of levers respectively, and a third elongate cable connected to said support member and another said plurality of levers respectively;

wherein a first pair of said U-shaped clamps are coupled to distal end portions of said mounting brackets respectively;

wherein said second end portions of said plurality of levers extend outwardly and away from said wheel, wherein a second pair of said U-shaped clamps are coupled to proximal end portions of said mounting brackets respectively.

2. A human powered vehicle including a brake system and comprising:

a wheelbarrow including a frame and a wheel connected thereto;

a plurality of elongate mounting brackets having opposed end portions connected to said frame of said wheelbarrow and an axle passing through said wheel respectively so that said plurality of mounting brackets become disposed on opposite sides of said wheel;

a plurality of levers including first end portions pivotally connected to said plurality of mounting brackets respectively, said plurality of levers further including second end portions disposed rearwardly from said first end portions respectively;

a plurality of brake pads connected to said plurality of levers and extending inwardly towards opposed sides of said wheel respectively;

a brake handle connected to said frame;

cable means cooperating with said brake handle for causing said plurality of brake pads to engage and disengage said wheel, said cable means being connected to said brake handle and to said second end portions of said plurality of levers respectively; and a plurality of U-shaped clamps adjustably connectable to the axle and to the wheelbarrow frame such that said mounting brackets can be slidably positioned along at least a longitudinal portion of the axle and the wheelbarrow frame respectively to thereby allow a user to retrofit said brake system onto various wheelbarrows having alternate sized and shaped wheels, wherein said mounting brackets extend substantially orthogonal to the axle and are slidably engageable with the axle along a linear path defined orthogonal to a longitudinal length of said mounting brackets respectively;

wherein said cable means comprises a support member, a first elongate cable having opposed end portions connected to said brake handle and said support member respectively, a second elongate cable connected to said support member and one said plurality of levers respectively, and a third elongate cable connected to said support member and another said plurality of levers respectively;

wherein a first pair of said U-shaped clamps are coupled to distal end portions of said mounting brackets respectively;

wherein said second end portions of said plurality of levers extend outwardly and away from said wheel, wherein a second pair of said U-shaped clamps are coupled to proximal end portions of said mounting brackets respectively.

* * * * *